United States Patent [19]
Goeke et al.

[11] 4,170,589
[45] Oct. 9, 1979

[54] CATALYTIC POLYMERIZATION OF ETHYLENE WITH SUPPORTED CHROMIUM [II] CATALYST IN THE PRESENCE OF A PHENOLIC ANTIOXIDANT

[75] Inventors: George L. Goeke, Kendall Park; Anthony D. Hamer; Frederick J. Karol, both of Belle Mead, all of N.J.

[73] Assignee: Union Carbide Corporation, New York, N.Y.

[21] Appl. No.: 880,079

[22] Filed: Feb. 22, 1978

[51] Int. Cl.$^2$ .......................... C08K 5/13; C08K 4/78; C08F 10/02
[52] U.S. Cl. ................. 260/45.95 H; 260/45.95 R; 526/106; 526/123; 526/130; 526/135; 526/154
[58] Field of Search ............... 526/106, 123, 130, 135, 526/154; 260/45.95 B, 45.95 H, 45.95 R

[56] References Cited

U.S. PATENT DOCUMENTS

| | | | |
|---|---|---|---|
| 3,026,264 | 3/1962 | Rocklin et al. | 260/45.95 B |
| 3,347,938 | 10/1967 | Bell et al. | 260/45.95 H |
| 3,394,020 | 7/1968 | Bell et al. | 260/45.95 H |
| 3,458,473 | 7/1969 | Starnes, Jr. | 260/45.95 R |
| 3,644,538 | 2/1972 | Starnes, Jr. | 260/45.95 R |
| 3,682,904 | 8/1972 | Spacht | 260/45.95 H |
| 4,015,059 | 3/1977 | Karol | 526/130 |
| 4,065,612 | 12/1977 | Hamer et al. | 526/130 |
| 4,077,904 | 3/1978 | Noshay et al. | 526/130 |

Primary Examiner—Alan Holler
Attorney, Agent, or Firm—James J. O'Connell

[57] ABSTRACT

An improved method for preparing ethylene polymers with certain supported chromium [II] catalysts wherein the improvement comprises employing said catalyst in the presence of phenolic antioxidant.

11 Claims, No Drawings

CATALYTIC POLYMERIZATION OF ETHYLENE WITH SUPPORTED CHROMIUM [II] CATALYST IN THE PRESENCE OF A PHENOLIC ANTIOXIDANT

BACKGROUND OF THE INVENTION

1. Field of the Invention

The invention relates to the catalytic polymerization of ethylene, alone, or with other α-olefin monomers.

2. Description of the Prior Art

U.S. Pat. No. 3,709,853 discloses the use of an inorganic oxide supported bis-cyclopentadienyl chromium [II] compound as a catalyst for the polymerization of ethylene alone, or with other α-olefins.

U.S. Pat. No. 4,015,059 discloses the use of bis (indenyl)-and bis(fluoroenyl)-chromium [II] compounds deposited on activated inorganic oxide supports to provide catalysts for the polymerization of ethylene in high yields.

Ethylene polymers made with these supported chromium [II] catalysts are susceptible to degradation by thermal and oxidative processes. The severity of this degradation depends upon factors such as, the productivity of the catalyst, the degree of branching of the polymer, the conditions under which the polymer is stored and the conditions under which the polymer is processed.

This degradation can be controlled by the addition of various antioxidants to the polymer during compounding. However, the efficiency of the antioxidant may be diminished because of, for example, poor dispersion of the antioxidant in the polymer and problems of retaining the antioxidant in the polymer after it has been blended into the polymer.

SUMMARY OF THE INVENTION

It has now been found that ethylene polymers which are more stable against oxidation are prepared by using certain inorganic oxide supported chromium [II] catalysts to which a phenolic antioxidant has been added.

An object of the present invention is to provide ethylene polymers which are more stable towards oxidation during storage, as in resin silos, for example, and during fabrication, using a supported chromium [II] catalyst.

Another object of the present invention is to provide a means for maximizing antioxidant dispersion through ethylene polymers made with certain supported chromium [II] catalyst to which has been added a phenolic antioxidant.

DESCRIPTION OF THE PREFERRED EMBODIMENT

Selected phenolic antioxidants are added to ethylene polymerization reactions using certain inorganic oxide supported chromium [II] catalysts to provide ethylene polymers which have improved stability towards oxidative degradation. These selected phenolic antioxidants may also be added to these certain inorganic oxide supported chromium [II] catalysts prior to the polymerization reaction to provide these stabilized ethylene polymers.

THE CHROMIUM [II] COMPOUNDS

The chromium [II] compounds which may be used as the catalysts in the present invention have the structure $$Ar-Cr[II]-Ar'$$

wherein Ar and Ar' are the same or different and are radicals of the structure (a) cyclopentadienyl radicals of the structure:

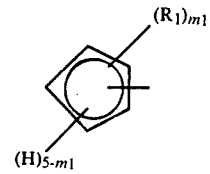

wherein each $(R_1)$ is independently $C_1$ to $C_{20}$ hydrocarbon radicals and each $m_1$ is independently an integer of 0 to 5, and (b) indenyl radicals of the structure:

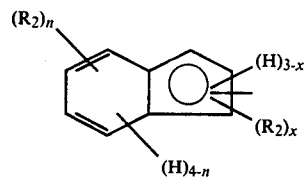

wherein the (R)s are the same or different $C_1$ to $C_{10}$ hydrocarbon radicals, n is an integer of 0 to 4 and x is an integer of 0 to 3, and (c) fluorenyl radicals of the structure:

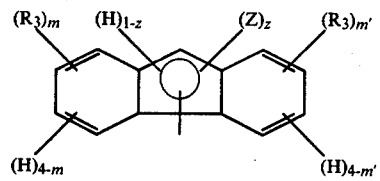

wherein the (R)'s may be the same or different $C_1$ to $C_{10}$ hydrocarbon radicals, m and m' may be the same or different integers of 0 to 4, (Z) is H or $(R_3)$ and z is 0 or 1. The $(R_1)$, $(R_2)$, and $(R_3)$ hydrocarbon radicals may be saturated or unsaturated, and they may include aliphatic, alicyclic and aromatic radicals such as methyl, ethyl, propyl, butyl pentyl, cyclopentyl, cyclohexyl, allyl, phenyl and napthyl radicals.

The preferred radicals for Ar and Ar' are cyclopentadienyl radicals.

The bis(cyclopentadienyl) chromium [II] compounds which may be used as catalysts on the inorganic oxide supports in accordance with the present invention may be prepared as disclosed in U.S. Pat. Nos. 2,870,183 and 3,071,605. The fused ring indenyl and fluorenyl compounds which may be used on the inorganic oxide supports in accordance with the present invention may be prepared, for example, as disclosed in Advances in Organometallic Chemistry by J. M. Birmingham, F. G. A. Stone and R. West, Eds., Academic Press, New York, 1964, pages 377–380, and U.S. Pat. No. 4,015,059, which are incorporated herein by reference.

About 0.001 to 25%, or more, by weight of the chromium [II] compound is used on the inorganic oxide support, based on the combined weight of the chromium [II] compound and the inorganic oxide support. The amount of the chromium [II] compound which can be deposited on the support varies, depending on the particular support being used, and the activation or dehydration temperature of such support. Typically about one fourth to one half of the amount of the chromium [II] compound that could be deposited on the support is used to facilitate introducing the compound into the reactors, but extremes in amounts of from near zero to total saturation of the support can be used without adverse effect on final polymer properties.

The inorganic oxide materials which may be used as a support for the chromium [II] compounds are materials having a high surface area, that is, a surface area in the range of about 50 to about 1000 square meters per gram. The inorganic oxides which may be used include silica, alumina and silica-alumina.

Because the chromium [II] compounds are sensitive to moisture, the catalyst support should be completely dried before it is brought into contact with the chromium [II] compounds. This is normally done by simply heating or pre-drying the catalyst support with an inert gas prior to use. It has been found that the temperature of drying has an appreciable effect on the relative productivity of the catalyst system and on the molecular weight distribution and the melt index of the polymer produced.

Drying or activation of the support can be accomplished at nearly any temperature up to about its sintering termperature for a period of time which is at least sufficient to remove the absorbed water from the support while at the same time avoiding such heating as will remove all of the chemically bound water from the support. The passage of a stream of dry inert gas through the support during the drying aids in the displacement of the water from the support. Drying temperature of from about 200° C. to 1000° C. for a short period of about four hours or so should be sufficient if a well dried inert gas is used, and the temperature is not permitted to get so high as to completely remove the chemically bound hydroxyl groups on the surface of the support.

Any grade of silica containing support can be used but intermediate density (MSID) silica having a surface area of about 300 square meters per gram and a pore diameter of about 200 Å, and an average particle size of about 70 microns and intermediate density (ID) silica having a surface area of about 300 square meters per gram, a pore diameter of about 160 Å and an average particle size of about 100 microns are preferred. Other grades having a surface area of about 600 square meters per gram, a pore diameter of 50–70 Å and an average particle size of about 60 microns are also quite satisfactory. Variations in melt index control and in polymer productivity can be expected with different grades of supports.

The supported chromium [II] catalyst can be prepared by a slurry technique, where the selected and properly dried support is added, under conditions which exclude the presence of air and moisture to a solution containing the chromium [II] compound and solvent to form a slurry. The solvents which may be used include saturated aliphatic hydrocarbons, such as hexane, heptane, pentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like. Particularly preferred solvent media are cyclohexane, pentane, isopentane, hexane and heptane. The solvents are treated to exclude air and moisture. The slurry may be stirred for a period of up to about 4 hours to obtain good adsorption of the chromium [II] compound on the support.

The supported chromium [II] compound can then be treated with the phenolic antioxidant in the slurry system at a temperature of from about 0° to 60° C. and preferably from about 15° to 40° C. The catalyst can be evaporated under conditions which exclude oxygen and moisture to yield a dry, powdery supported chromium [II] compound. Where a dried, powdery, catalyst is desired, as for fluid bed reaction systems, the drying of the supported catalyst should be accomplished at a temperature of $\leq 90°$ C. The use of higher drying temperature tends to have an adverse effect (a lowering) on the melt index of the resin made with the catalyst.

About 0.1 to $1 \times 10^{-5}$ weight % of the supported catalyst is used per mol of monomer being polymerized. The amount of catalyst being employed may vary depending on the type of polymerization procedure being employed and the amount of catalyst poisons in the system.

PHENOLIC ANTIOXIDANT

The phenolic antioxidants of this invention contain a phenolic hydroxy group and have the following structure:

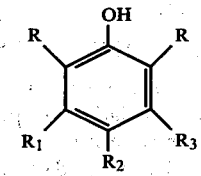

wherein each R is independently $C_4$ to $C_{12}$ branched hydrocarbon radicals with steric factors (Es) less than $-1.5$ as defined in M. S. Newman, *Steric Effects in Organic Chemistry*, John Wiley & Sons, New York, 1956, p. 598; $R_1$, $R_2$ and $R_3$ are each independently hydrogen, saturated or unsaturated hydrocarbon radicals or aryl radicals which are unsubstituted with polar groups or substituted with polar groups such as, OH, ether, or halogen, wherein the aryl radicals containing the polar groups contain R groups in adjacent positions to these polar groups.

The preferred phenolic antioxidants include:

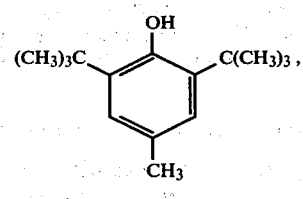

and [2,6-di-t-butyl-4-methyl phenol]

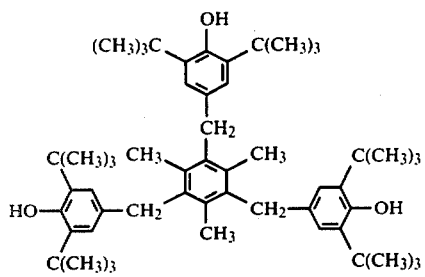

[1,3,5-trimethyl-2,4,6 tris (3,5-di-t-butyl, 4-hydroxy benzyl) benzene]

These phenolic antioxidants are known in the art and are added as antioxidants to formed olefin polymers.

The phenolic antioxidant is utilized in stabilizing amounts. Preferably the phenolic antioxidant is used is amounts of $\leq 1$ to about 100 moles per mole of the chromium [II] compound.

These phenolic antioxidants may be added to the catalyst as has been heretofore described, or may be added to the reactor during the polymerization reaction. When the latter method is preferred, the phenolic antioxidant can be added as a solution in a hydrocarbon solvent or absorbed on some inert material.

THE MONOMERS

Ethylene may be polymerized alone, in accordance with the present invention, or it may be copolymerized with one or more other alpha-olefins containing 3 to about 12 carbon atoms. The other α-olefin monomers may be mono-olefins or non-conjugated di-olefins.

The mono-α-olefins which may be copolymerized with ethylene would include propylene, butene-1, pentene-1, 3-methylbutene-1, hexene-1, 4-methyl-pentene-1, 3-ethylbutene-1, heptene-1, octene-1, decene-1, 4,4-dimethylpentene-1, 4,4-diethyl hexene-1, 3,4-dimethylhexene-1, 4-butyl-1-octene, 5-ethyl-1-decene, 3,3-dimethylbutene-1, and the like. Among the diolefins which may be used are 1,5-hexadiene, dicyclopentadiene, ethylidene norbornene, and other non-conjugated diolefins.

THE POLYMERS

The polymers which are prepared in accordance with the teachings of the present invention are solid materials which have densities of about 0.945 to 0.970, inclusive, and melt indexes of about 0.1 to 100 or more.

The preferred polymers are the homopolymers of ethylene. The copolymers will contain at least 50 weight %, and preferably at least 80 weight %, of ethylene.

THE POLYMERIZATION REACTION

After the catalysts have been formed, the polymerization reaction is conducted by contacting the monomer charge, and substantially in the absence of catalyst poisons, with a catalytic amount of the catalyst at a temperature and at a pressure sufficient to initiate the polymerization reaction. If desired, an inert organic solvent may be used as a diluent and to facilitate materials handling.

The polymerization reaction is carried out at temperatures of from about 30° C. or less up to about 200° C. or more, depending to a great extent on the operating pressure, the pressure of the entire monomer charge, the particular catalyst being used and its concentration. The selected operating temperature is also dependent upon the desired polymer melt index since such temperature is also a factor in adjusting the molecular weight of the polymer. Preferably, the temperature is from about 30° C. to about 100° C. in the conventional slurry or "particle forming" process which is conducted in an inert organic solvent medium. As with most catalyst systems, the use of higher polymerization temperatures tends to produce lower weight average molecular weight polymers, and consequently polymers of higher melt index.

The pressure can be any pressure sufficient to initiate the polymerization of the monomer charge and can be from subatmospheric pressure, using an inert gas as a diluent, to superatmospheric pressure of up to about 100,000 psig (pounds per square inch gauge), or more, but the preferred pressure is from atmospheric up to about 600 psig. As a general rule, a pressure of 20 to 400 psig is preferred.

When an inert organic solvent medium is employed in the process of this invention it should be one which is inert to all the other components and products of the reaction system and be stable at the reaction conditions being used. It is not necessary, however, that the inert organic solvent medium also serve as a solvent for the polymer produced. The inert organic solvents which may be used include saturated aliphatic hydrocarbons, such as hexane, heptane, pentane, isopentane, isooctane purified kerosene and the like, saturated cycloaliphatic hydrocarbons, such as cyclohexane, cyclopentane, dimethylcyclopentane and methylcyclohexane and the like aromatic hydrocarbons such as benzene, toluene, xylene, and the like. Particularly preferred solvent media are cyclohexane, pentane, isopentane, hexane and heptane.

When it is preferred to conduct the polymerization to a high solids level as hereinbefore set forth, it is, of course, desirable that the solvent be liquid at the reaction temperature. For example, when operating at a temperature which is lower than the solution temperature of the polymer in the solvent, the process can be essentially a slurry or suspension polymerization process in which the polymer actually precipitates out of the liquid reaction medium and in which the catalyst is suspended in a finely divided form.

This slurry system is of course dependent upon the particular solvent employed in the polymerization and its solution temperature for the polymer prepared. Consequently, in the "particle form" embodiment, it is most desirable to operate at a temperature which is lower than the normal solution temperature of the polymer in the selected solvent. For example, polyethylene prepared herein may have a solution temperature in cyclohexane of about 90° C., whereas in pentane its solution temperature may be about 110° C. It is characteristic of this "particle form" polymerization system that a high polymer solids content is possible even at low temperatures, if sufficient agitation is provided so that adequate mixing of the monomer with the polymerizing mass can be accomplished. It appears that while the polymerization rate may be slightly slower at the lower temperature, the monomer is more soluble in the solvent medium, thus counteracting any tendency to low polymerization rates and/or low yields of polymer.

It is also characteristic of the slurry process that the monomer appears to have substantial solubility characteristics even in the solids portion of the slurry so that as long as adequate agitation is provided, and the polymerization temperature is maintained, a broad range of size of solid particles in the slurry can be provided. Experience has shown that the slurry technique can produce a system having more than fifty percent solids content, provided conditions of sufficient agitation are maintained. It is particularly preferable to operate the slurry process in the range of 30–40 weight percent of polymer solids.

Recovery of the polymer from the solvent medium is, in this embodiment, reduced to a simple filtration and/or drying operation and no efforts need be expended in polymer clean up and catalyst separation or purification. The residual concentration of catalyst in the polymer is so small it can be left in the polymer.

When the solvent serves as the principal reaction medium it is, of course, desirable to maintain the solvent medium substantially anhydrous and free of any possible catalyst poisons such as moisture and oxygen, by redistilling or otherwise purifying the solvent before use in this process. Treatment with an absorbent material such as high surface area silicas, aluminas, molecular sieves and like materials are beneficial in removing trace amounts of contaminants that may reduce the polymerization rate or poison the catalyst during the polymerization reaction.

By conducting the polymerization reaction in the presence of hydrogen, which appears to function as a chain transfer agent, the molecular weight of the polymer may be further controlled.

Experience has shown that hydrogen may be used in the polymerization reaction in amounts varying between about 0.001 to about 10 moles of hydrogen per mole of olefin monomer.

The homo- or co-polymerization of ethylene with the catalysts of this invention can also be accomplished in a fluid bed reaction process. An example of a fluid bed reactor and process which can be used for this purpose is disclosed in United Kingdom Pat. No. 1,253,063, which disclosure is incorporated herein by reference.

The following examples are designed to illustrate the present invention and are not intended as a limitation upon the scope thereof.

EXAMPLES 1 to 13

A. Catalyst Preparation

Catalysts were prepared with and without phenolic antioxidants to demonstrate the utility of such compounds in accordance with the teachings of the present invention. For comparative purposes, the catalyst of Example 1 was made without any phenolic antioxidant. The catalysts of Examples 2 to 6 were made by adding the following phenolic antioxidant thereto:

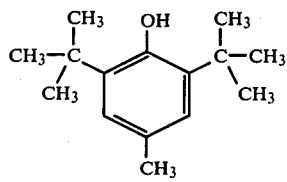

The catalysts of Examples 7 to 10 were made by adding the following phenolic antioxidant thereto:

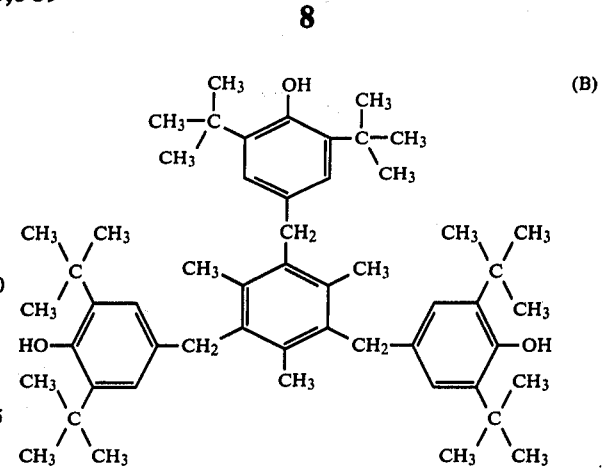

The catalysts of Examples 11 to 13 were made by adding the following phenolic antioxidant thereto:

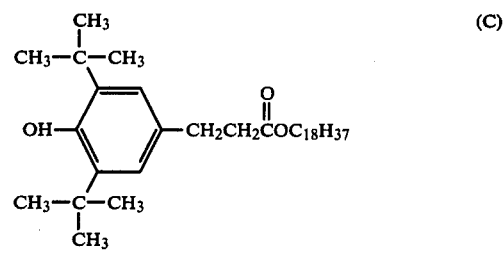

The support used for each catalyst was Davison silica which had a surface area of about 300 square meters per gram and an average pore-diameter of about 200 Å. The support had previously been activated by being heated under nitrogen for about 2 hours at about 800° C.

The chromium II compound used for each catalyst was bis(cyclopentadienyl) chromium [II].

Each catalyst was prepared by depositing 10 mg. of bis(cyclopentadienyl) chromium [II] on 0.4 grams of the silica in 100 ml. of n-hexane.

The phenolic antioxidants (Examples 2 to 13) were added to the slurry of the deposited catalyst as a solution in n-hexane. The type of phenolic antioxidant and the ratio of phenolic antioxidant to chromium are listed below in Table I.

The resulting slurried catalyst systems were then added, as is, to the polymerization reactions, without attempting to separate the catalyst from the solvent.

B. Activity Studies in Ethylene Polymerization

Each of the catalysts prepared above was used to homo-polymerize ethylene for 1.0 hour at a temperature of 80° C. and at a pressure of 200 psig. The pressure was supplied by the ethylene feed, supplemented, in some cases, by a feed of hydrogen. The polymerization reactions were conducted under slurry polymerization conditions in 500 ml of n-hexane. Table I below lists, with respect to the resulting polymers, the yield in grams, the melt index (MI), in decigrams per 10 minutes (ASTM D-1238 -measured at 190° C.); the flow index (HLMI), in decigrams per 10 minutes (ASTM D-1238-measured at 10 times the weight used in the melt index test above); the melt flow ratio (MFR) (Flow Index/Melt Index), and the percent of the antioxidant in the polymer produced.

A review of the data in Table I shows that when phenolic antioxidants A and B, of the present invention, are used, as in Examples 2 to 10, the yield of polymer, melt index, flow index and melt flow ratio of the resulting polymer are comparable to polymers produced without the use of phenolic antioxidant. This indicates that the antioxidant has little or no effect on polymer productivity or properties. However, when an antioxidant of type C is used, as in Examples 11 to 13, substantial decrease in catalytic activity is observed.

catalyst of Example 18 as a solution in n-hexane. No antioxidant was used in Example 17.

The type of catalyst and phenolic antioxidant and ratio of phenolic antioxidant to chromium are listed below in Table II.

B. Polymerization Reactions

Each of the catalysts prepared as described above were used to homopolymerize ethylene as described above with respect to Examples 1 to 13, at 80° C. (Ex-

TABLE I

Effect of Addition of Antioxidant to Chromocene Catalysts on Ethylene Polymerization

| Example | Phenolic Antioxidant | Ratio of PA/Cr[1] | Yield of Polymer (g) | Melt Index (gr/10 min.) | Flow Index (gr/10 min.) | Melt Flow Ratio | Antioxidant in Polymer[2] (%) |
|---|---|---|---|---|---|---|---|
| 1 | — | — | 151 | 0.86 | 49 | 47 | — |
| 2 | A | 0.33 | 149 | 7.2 | 286 | 40 | 0.002 |
| 3 | A | 1.0 | 134 | 2.7 | 104 | 38 | 0.009 |
| 4 | A | 2.0 | 110 | 1.6 | 72 | 44 | 0.02 |
| 5 | A | 4.0 | 166 | 3.2 | 131 | 40 | 0.03 |
| 6 | A | 8.0 | 160 | 1.8 | 73 | 41 | 0.06 |
| 7 | B | 1.0 | 189 | 1.3 | 64 | 50 | 0.02 |
| 8 | B | 2.0 | 138 | 1.2 | 55 | 46 | 0.06 |
| 9 | B | 3.0 | 191 | 2.0 | 78 | 39 | 0.08 |
| 10 | B | 4.0 | 165 | 1.1 | 55 | 50 | 0.10 |
| 11 | C | 0.33 | 132 | 1.7 | 89 | 53 | 0.007 |
| 12 | C | 0.67 | 88 | 1.1 | 52 | 46 | 0.02 |
| 13 | C | 1.0 | 67 | 1.6 | 62 | 39 | 0.04 |

[1] Ratio of phenolic antioxidant to chromium in catalyst
[2] Calculated value

EXAMPLES 14 to 18

A. Catalyst Preparation

Catalysts for Examples 14 to 16 were prepared by depositing 32 micromoles of bis-triphenylsilyl-chromate on 1 gram of Davison silica support which had a surface area of about 300 square meters per gram and an average porediameter of about 200 Å. The support had been previously activated by being heated under nitrogen for about 2 hours at about 600° C. and reduced with diethyl aluminum ethoxide (5/1 aluminum/chromium) as described in U.S. Pat. No. 3,324,095, which patent is incorporated herein by reference. Phenolic antioxidants C and B were then added to the slurry of the deposited catalyst in Examples 15 and 16, respectively, as a solution in n-hexane. No phenolic antioxidant was added to the catalyst used in Example 14.

Catalyst for Examples 17 and 18 were prepared by dissolving 40 micromoles of chromium trioxide in a minimal amount of water and mixing this with the silica of Examples 14 to 16. The catalyst was then dried in a furnace tube at 750° C. for 16 hours. These catalyst and their preparation are fully described in U.S. Pat. No. 2,825,721, which is incorporated herein by reference. Phenolic antioxidant B was then added to the deposited amples 14 to 16) and 85° C. (Examples 18 and 19). The yield, melt index, flow index and melt flow ratio of the polymer produced are listed below in Table II.

A review of this data shows that addition of phenolic antioxidant to other supported chromium [II] catalysts, i.e., the bis-triphenyl silyl chromate catalysts of Examples 14 to 16 and the chromium oxide catalysts of Examples 17 and 18, decrease catalytic activity and yield of polymer, as well as changing polymer properties.

TABLE II

Effect of Addition of Antioxidant to Chromocene Catalysts on Ethylene Polymerization

| Example | Catalyst | Phenolic Antioxidant | Ratio of PA/Cr | Yield of Polymer (g) | Melt Index (gr/10 min.) | Flow Index (gr/10 min) | Melt Flow Ratio |
|---|---|---|---|---|---|---|---|
| 14 | Silyl Chromate[1] | — | — | 232 | 0.54 | 32.4 | 60 |
| 15 | " | C | 1 | 83 | 1 | 0.1 | 100 |
| 16 | " | B | 1 | 86 | 0.07 | 8.5 | 117 |
| 17 | Chromium Oxide | — | — | 200 | 0.04 | 5.5 | 126 |
| 18 | " | B | 1 | 4 | — | — | — |

[1] refers to bis-triphenyl silyl chromate

EXAMPLES 19 to 25

A. Catalyst Preparation

Catalysts for Examples 19 and 25 were prepared according to the procedures as set forth in Examples 1 to 13 and 14 and 16. The chromium [II] compound used for each of the catalysts of Examples 19,21,23 and 24 was bis(cyclopentadienyl) chromium [II] (chromocene) while the chromium [II] compound used for each of the catalysts of Examples 20, 22 and 25 was bis triphenylsilyl chromate. Phenolic antioxidants B and C were then added to the slurry of the deposited catalysts of Examples 21 to 25 as a solution in n-hexane. No phenolic antioxidant was added to the catalysts of Examples 19 and 20.

The type of catalyst and phenolic antioxidant and ratio of phenolic antioxidant to chromium are listed below in Table III.

B. Polymerization Reaction

Each of the catalysts prepared as described above were used to homopolymerize ethylene as described above. The percent of phenolic antioxidant in the polymer as well as the induction time are listed below in Table III. The induction time is the time, in minutes, required for a polymer to undergo reaction with oxygen (oxidation) at a given temperature. Induction times were measured in air at 180° C. using a high pressure DuPont Differential Scanning Colorimeter Cell. A discussion of the relationship between induction time and oxidative stability is found in an article by A Rubin et al, Industrial and Engineering Chemistry, 53, No. 2, p. 17, which is incorporated herein by reference.

A review of the data shows that addition of the phenolic antioxidant of the present invention (antioxidant B) to bis(cyclopentadienyl) chromium [III] catalyst stabilizes the resins as indicated by the long induction times (Examples 21,23,24) as compared with the same catalyst where no antioxidant was added (Example 19). Also, the data shows that the phenolic antioxidant of the present invention does not stabilize polymers produced with other chromium [II] containing catalysts, i.e., bis triphenyl silyl chromate, (Example 22) as effectively as the claimed chromium [II] containing catalyst, as shown by the short indiction times.

TABLE III

Effect of Addition of Phenolic Antioxidant to Chromocene and Silyl Chromate Catalysts on DSC Induction Time

| Example | Catalyst | Phenolic Antioxidant | Ratio of PA/Cr | Antioxidant in Polymer (%) | Induction Time (min.) |
|---|---|---|---|---|---|
| 19 | Chromocene | — | — | — | 1.2 |
| 20 | Silyl Chromate[1] | — | — | — | 0.8 |
| 21 | Chromocene | B | 1.0 | 0.02 | 25 |
| 22 | Silyl Chromate | B | 1.0 | — | 11.6 |
| 23 | Chromocene | B | 2.0 | 0.06 | 99 |
| 24 | " | C | 0.67 | 0.02 | 8 |
| 25 | Silyl Chromate | C | 1.0 | — | 4.7 |

[1]refers to bis triphenyl silyl chromate

What is claimed is:

1. In a process for polymerizing a monomer charge comprising at least a major amount of ethylene by contacting said charge with a catalyst comprising chromium [11] compound supported on activated inorganic oxide, the improvement which comprises employing said catalyst in the presence of a phenolic antioxidant of the formula:

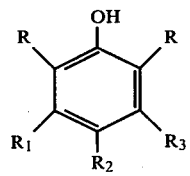

wherein each R is independently $C_4$ to $C_{12}$ branched hydrocarbon radicals with steric factors, Es, less than $-1.5$; $R_1$, $R_2$ and $R_3$ are independently hydrogen, saturated or unsaturated aliphatic hydrocarbon radicals or aryl radicals which are unsubstituted with polar groups or substituted with polar groups, wherein the aryl radicals containing the polar groups contain R groups in adjacent position thereto, and said chromium [II] compound is of the formula:

$$Ar-Cr[II]-Ar'$$

wherein Ar and Ar' are the same or different and are radicals of the structure:

(a) cyclopentadienyl radicals of the structure

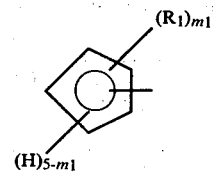

where each ($R_1$) is independently $C_1$ to $C_{20}$ hydrocarbon radicals, and each $m_1$ is an integer of 0 to 5;

(b) indenyl radicals of the structure:

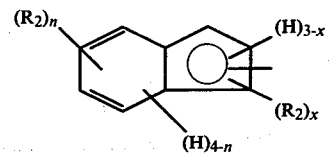

wherein the (R)s are the same or different $C_1$ to $C_{10}$, hydrocarbon radicals, and n is an integer of 0 to 4 and x is an integer of 0 to 3, and (c) fluorenyl radicals of the structure:

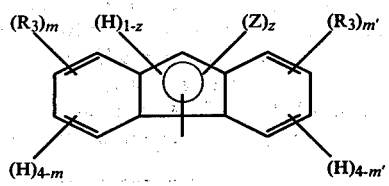

wherein the (R)'s may be the same or different $C_1$ to $C_{10}$ hydrocarbon radicals, m and m' may be the same or different integers of 0 to 4 inclusive, and (Z) is H or ($R_3$) and z is 0 or 1.

2. A process as in claim 1 in which said chromium [II] compound is of the structure:

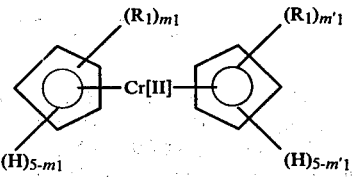

wherein each ($R_1$) is independently a $C_1$ to $C_{20}$ hydrocarbon radical and $m_1$ and $m'_1$ are integers of 0 to 5.

3. A process as in claim 2 in which said chromium [11] compound comprises bis(cyclopentadienyl) chromium [11].

4. A process as in claim 3 in which said phenolic antioxidant is 1,3,5-trimethyl-2,4,6 tris(3,5-di-t-butyl-4-hydroxy benzyl) benzene.

5. A process as in claim 3 in which said phenolic antioxidant is 2,6-di-t-butyl-4-methyl phenol.

6. The product of the process of claim 3.

7. A process as in claim 1 in which said phenolic antioxidant is 1,3,5-trimethyl-2,4,6-tris(3,5-di-t-butyl-4-hydroxy benzyl) benzene.

8. A process as in claim 1 in which said phenolic antioxidant is 2,6-di-t-butyl-4-methyl phenol.

9. The product of the process of claim 1.

10. A process as in claim 1 in which said phenolic antioxidant is added to said process prior to the polymerization reaction.

11. A process as in claim 1 in which said phenolic antioxidant and said catalyst are added independently to the polymerization reactor.

* * * * *